United States Patent
Ansberry et al.

(10) Patent No.: US 6,219,044 B1
(45) Date of Patent: Apr. 17, 2001

(54) METHOD FOR MANAGING TOP-LEVEL WINDOWS WITHIN A CONFERENCING NETWORK SYSTEM

(75) Inventors: Catherine Malia Ansberry; Todd W. Fuqua; Erik P. Mesterton, all of Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/387,502

(22) Filed: Feb. 13, 1995

(51) Int. Cl.⁷ .................................................. G06F 15/16
(52) U.S. Cl. ............................................ 345/329; 345/330
(58) Field of Search ...................... 395/153, 157, 395/158, 200, 200.1, 806, 329, 330, 331, 332, 340, 346, 680, 971, 200.01, 200.04; 364/222.2, 284.4, 927.63; 345/329, 330, 331, 332, 340

(56) References Cited

U.S. PATENT DOCUMENTS

| | | | | |
|---|---|---|---|---|
| 5,107,443 | * | 4/1992 | Smith et al. ............................. | 395/158 |
| 5,220,657 | * | 6/1993 | Bly et al. ................................ | 395/425 |
| 5,241,657 | * | 8/1993 | Fine et al. .............................. | 395/162 |
| 5,339,388 | * | 8/1994 | Bates et al. ............................ | 395/153 |
| 5,379,374 | * | 1/1995 | Ishizaki et al. ........................ | 395/155 |
| 5,392,400 | * | 2/1995 | Berkowitz et al. .................... | 395/200 |
| 5,408,600 | * | 4/1995 | Garfinkel et al. ..................... | 395/153 |
| 5,446,842 | * | 8/1995 | Schaeffer et al. ............... | 395/200.01 |
| 5,491,780 | * | 2/1996 | Fyles et al. ............................ | 395/153 |

OTHER PUBLICATIONS

Young et al., *The Window System Programming & Applications with Xt*, Prentice Hall, 1992, pp. 4–6.*

* cited by examiner

*Primary Examiner*—Stephen S. Hong
(74) *Attorney, Agent, or Firm*—Monica D. Lee; Felsman, Bradley, Vaden, Gunter & Dillon, LLP

(57) ABSTRACT

A method and system for managing top-level windows controlled by a conference enabler is disclosed. The system operates in a conferencing network system having a conference enabler for distributing applications to a plurality of servers. Each server has its own display. The method and system identifies a top-level window sent by the conferenced application. Next, it identifies whether a top-level window is among the requests sent by the conferenced application is a root window. The system then enters a window ID associated with the top-level window into a list of top-level windows. Then, the system provides a slot associated with the top-level window within the list for storing the window configuration of the top-level window as configured by each of the participant servers.

8 Claims, 5 Drawing Sheets

METHOD FOR MANAGING TOP-LEVEL WINDOWS WITHIN A CONFERENCING NETWORK SYSTEM

CROSS-REFERENCE TO RELATED APPLICATION

The present application is related to U.S. patent application Ser. No,. 08/387,500, field Feb. 13, 1995, entitled *Method and System For Switching Between Users In A Conference Enabled Application;* U.S. patent application Ser. No. 08/387,501, filed Feb. 13, 1995, entitled *Management And Classification of Events For An X Windows Conferencing Enabler;* U.S. patent application Ser. No. 08/387,503, filed Feb. 13, 1995, entitled *Method For Managing Visual Type Compatibility In A Conferencing Network System Having Heterogeneous Hardware;* U.S. patent application Ser. No. 08/387,504, filed Feb. 13, 1995, entitled *Method To Support Applications That Allocate Shareable Or Non-Shareable Colorcells In A Conferencing Network System Having A Heterogeneous Hardware Environment;* U.S. patent application Ser. No. 08/387,505, entitled *Method For Managing Pixel Selection In A Network Conferencing System;* U.S. patent application Ser. No. 08/387,506, entitled *Method And Apparatus For Translating Key Codes Between Servers Over A Conference Networking System,* all filed of even date herewith by the inventors hereof and assigned to the assignee herein, and incorporated by reference herein.

BACKGROUND OF THE INVENTION

1. Technical Field

The present invention relates, in general, to a conference enabled networking system and, more specifically, to the management of windows within a conferenced enabled window application distributed over a networking system. More specifically still, the present invention relates to a method of tracking the size and location of top-level windows for conference enabled X-windows applications for participants in a conference.

2. Description of the Related Art

Windows are the most fundamental of all resources formed by an X-windows application. Windows are grouped into hierarchial relationships, each having a parent (with the exception of the root window) and zero or more children. Application "top-level" windows are created as children of the root window. A window manager, if present, typically reparents these windows underneath one of its own windows in order to provide border controls for the application. From the conferencing enabler's perspective, the window is still considered to be a top-level window even though it may have been reparented by the window manager. Accordingly, a top-level application window may be defined as being one whose parent window is not owned by the application. Every application has at least one primary top-level window. "Pop-out" windows, such as, for example, pull-down menus and dialog boxes, are also generally implemented as top-level windows by X applications.

Top-level windows are of interest to the X conferencing enabler primarily for two reasons: input focus switching, and positioning of pull-down menus. Conference applications are made aware of the state, which include location, size, color, contents, etc., of top-level windows on the input focus X server. Since the application "thinks" that it is only talking to one server, it makes sense to return replies and events containing relevant window information from the input focus server. When the input focus is switched, the enabler must be able to inform a conferenced application of the different window configurations as they exist on the new input focus display. Top-level window locations are also used to correctly position pull-down menus belonging to a conferenced application for each participant.

Accordingly, what is needed is a method for allowing an X windows conferencing enabler to track top-level window configurations for participants in a conference.

SUMMARY OF THE INVENTION

It is therefore one object of the present invention to provide a conference enabled networking system.

It is another object of the present invention to provide a conferenced enabled networking system with management of windows within a conferenced enabled window application distributed over a networking system.

It is yet another object of the present invention to provide a method of tracking the size and location of top-level windows for conference enabled X-windows applications for participants in a conference.

The foregoing objects are achieved as is now described. According to the present invention, a method and system for managing top-level windows controlled by a conference enabler is disclosed. The invention operates in a conferencing network system having a conference enabler for distributing applications to a plurality of servers. Each server has its own display. In the invention, the system identifies a top-level window sent by the conferenced application. Next, it identifies whether a top-level window is among the requests sent by the conferenced application is a root window. The system then enters a window ID associated with the top-level window into a list of top-level windows. Then, the system provides a slot associated with the top-level window within the list for storing the window configuration of the top-level window as configured by each of the participant servers.

The system further monitors communications between the conferencing application and several servers to update the step of the top level window. This monitoring includes the monitoring of events between the conferencing application and the servers to identify any changes in the window's configuration. Then, the system updates the top-level window list with the information regarding either the state or window configurations. The invention also may request event information on behalf of the conferencing application and update the top-level window list with this information while the conferencing application has no knowledge of this occurrence.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
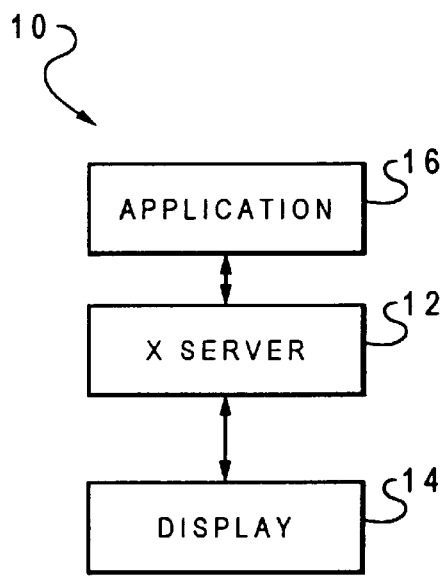
FIG. 1 depicts in accordance with a preferred embodiment of the present invention a block diagram of an X windows system that provides distributed client/server support for two-dimensional graphics applications.

FIG. 1 illustrates a block diagram of an X windows system 10 that provides distributed client/server support for two-dimensional graphics applications. An X server 12 manages a display 14 for an X application 16, which is a two-dimensional graphics display within the window.

Figure 2:
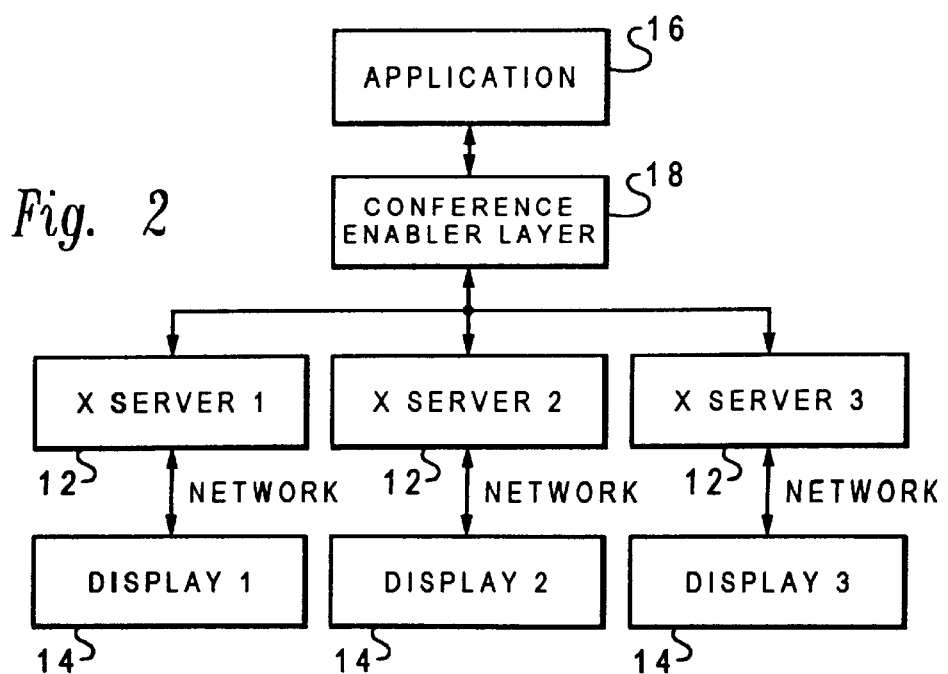
FIG. 2 depicts an X windows conferencing system according to FIG. 1 and further includes an X window conferencing enabler that is inserted between an application and an X server.

FIG. 2 depicts the same X windows conferencing system but further includes an X window conferencing enabler 18 that is inserted between an application 16 and an X server 12. To X server 12, X conferencing enabler 18 appears to be the application. At the same time, X conferencing enabler 18 appears as X server 12 to X application 16.

Figure 3:
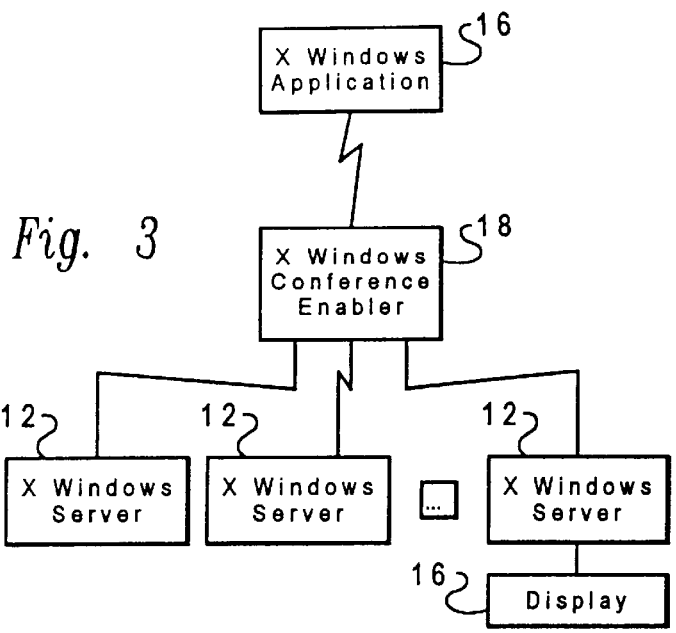
FIG. 3 depicts an X windows conferencing enabler connected to multiple X servers on behalf of the application according to the present invention.

X windows conferencing enabler 18, in FIG. 3, then connects to multiple X servers 12 on behalf of the application 16. This allow X windows conferencing enabler 18 to distribute the application to each display 14. The application is not aware that it is being distributed to multiple X servers. This arrangement is known as a "conference" and users at each display are known as conference "participants." Conferencing enabler 18 multiplexes and de-multiplexes the X protocol travelling between the X application and the X servers participating in the conference. For example, a request issued by the application (i.e., a request to create a window) is sent to each X server in the conference thereby allowing all participants to see the same information in "real time." Events and replies coming back the other way must be arbitrated in such a way that they do not "confuse" the application.

To ensure stability, the present invention discloses a method for allowing the X window conferencing enabler 18 to track top-level window configurations for participants in a conference. The conference enabler of FIG. 3 identifies top-level windows by monitoring Create Window requests coming from a conferenced application. If the parent window specified in the request is the root window, the window ID is entered into a list. The list is referred to as the Top-Level Window List. In addition to the window ID, the list entry contains a set of member fields used for storing size, location, and visibility information of the window as it exists on each participant's display. Since participants are free to move and resize the windows on their displays with the help of a window manager, the conference enabler must keep track of a window configuration for each participant separately.

Keeping the Top-Level Window List updated requires that the enabler monitor requests that update the state of a top-level window such as Configure Window and Reparent Window. If a window is reparented in such a way that it is no longer a top-level window, its entry is removed from the list. The enabler must also monitor events such as Configure Notify from each X server that reflect changes in a window's configuration. The Top-Level Window List is updated accordingly for each participant.

Figure 4:
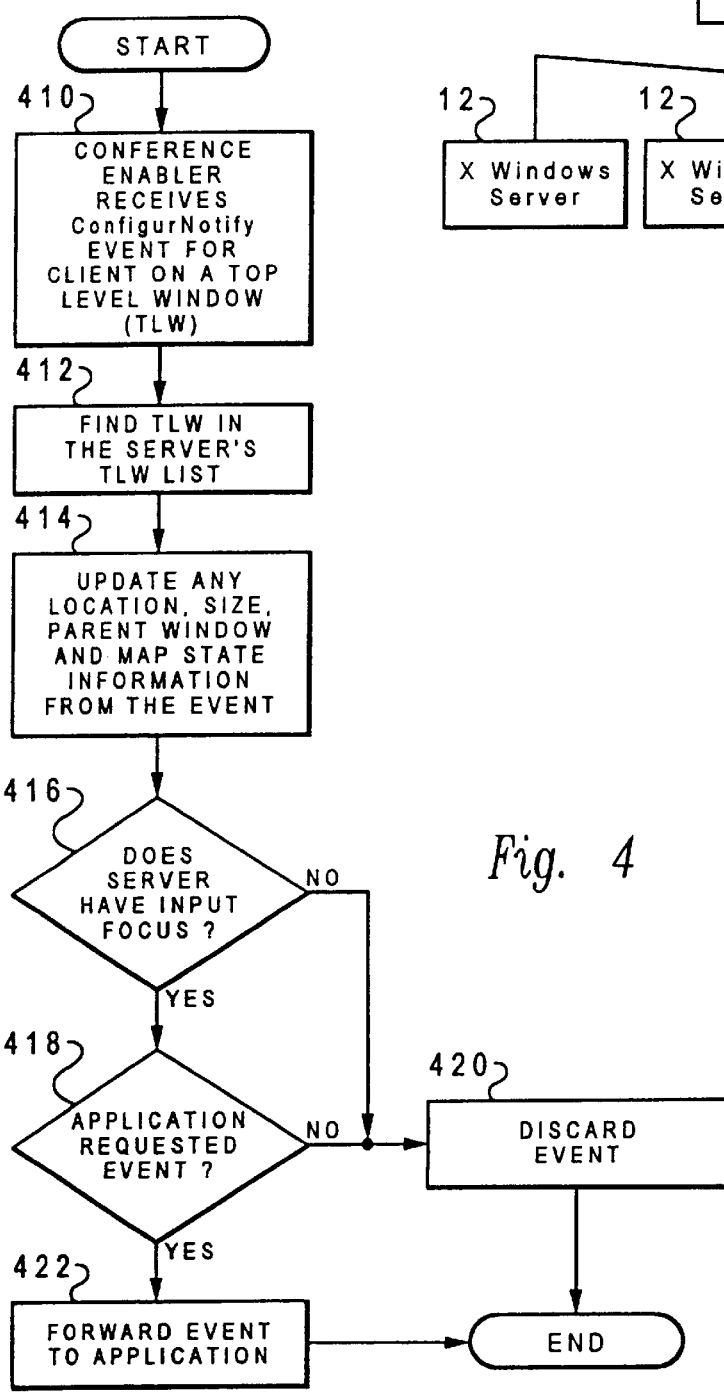
FIG. 4 depicts a block diagram of a flowchart for the execution of the Configure Notify events.
Figure 5:
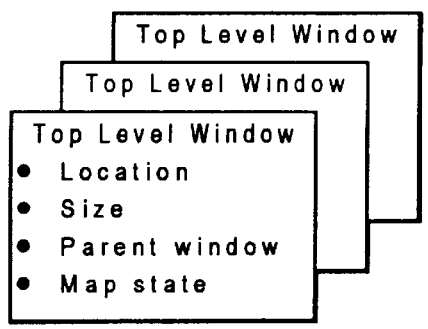
FIG. 5 is a depiction of a Top-Level Window List for each server.

FIG. 4 depicts a block diagram of a flowchart for the execution of Configure Notify events, and FIG. 5 is a depiction of a Top-Level Window List for each server. In step 410, the conference enabler receives a Configure Notify event from a server regarding a Top-Level Window (TLW). Then, in step 412, the enabler finds the TLW in the server's TLW List. In step 414, the system updates any location, size, parent window and map state information from the event, which is shown in FIG. 5. Next, in step 416, the enabler determines if the server has the input focus and if the application has requested the event (step 418), and if so, in step 422, forwards the event to the application. Otherwise, in step 420, the enabler discards the event.

An X server, with few exceptions, only generates events requested by a client on a given window. The conference enabler requires that it receive all events necessary to fully track the state top-level windows. To ensure this, the enabler forces selection of these events on its own behalf, even if the conferenced client did not actually ask for them. The conference enabler will, however, only forward to a client those events for which the client had asked.

The conference enabler always exposes the state of top-level windows as they exist on the input focus X server to a client. When the input focus changes hands, the conference enabler must step through the Top-Level Window List comparing the size and location of each window for both the old and new input focus participants. To present a view to the application that is consistent with the new input focus, the conference enabler sends "artificial" Configure Notify events to the client to indicate any changes in size or location for each window. The enabler, however, only does this for those windows that the application had requested on which to receive these events.

Figure 6:
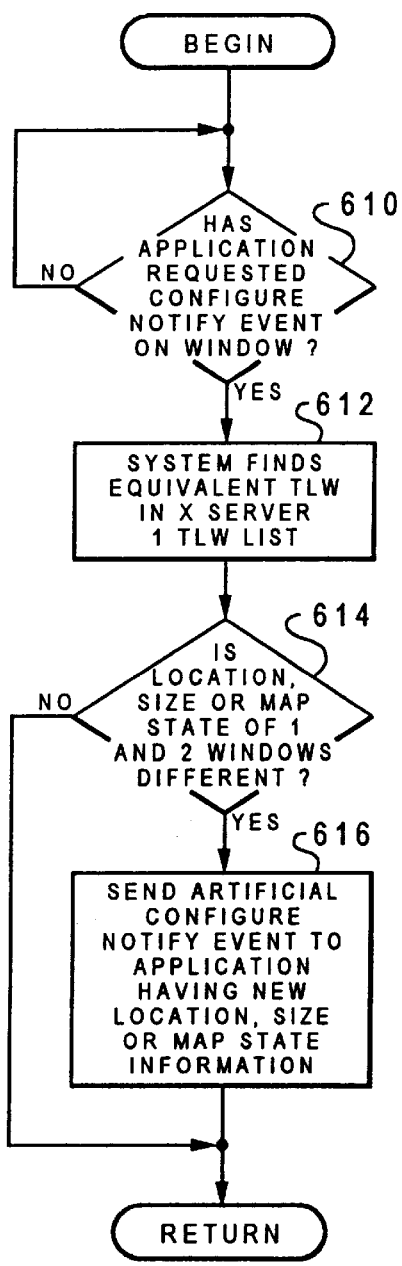
FIG. 6 is a block diagram of a flowchart depicting the steps implemented in changing the input focus.

FIG. 6 is a block diagram of a flowchart depicting the steps implemented in changing the input focus. With reference to FIG. 2, X server 1 currently has the input focus. X server 2 is the client to which the input focus will be assigned. Then, for each Top-Level Window in X server 1's Top-Level Window List, the system, in step 610, determines if the application has requested the Configure Notify events on this window. If so, in step 612, the system finds the equivalent Top-Level Window in X server 2's Top-Level Window List. Next, in step 614, the system determines if the location, size or map state of the two windows (A and B) are different, and if so, in step 616, sends an "artificial" Configure Notify event to the application containing the new location, size, or map state information.

Figure 7:
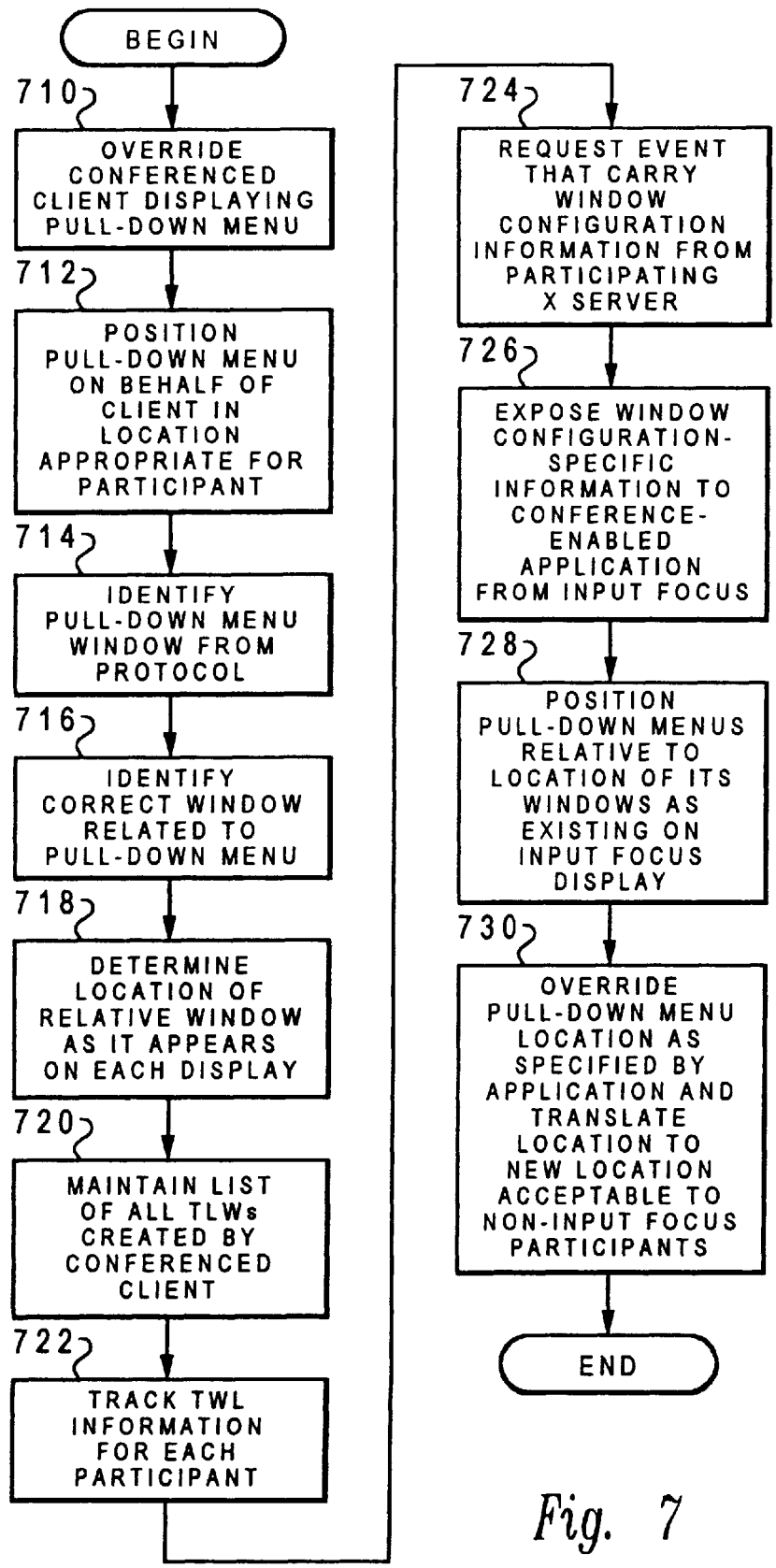
FIG. 7 depicts a flowchart illustrating the procedure for positioning pull-down menus; and, FIG. 8 is a flowchart depicting the method of the conferencing enabler overriding the pull-down menu location.

For a specific example of the positioning of a top-level window, a method for positioning pull-down menus within a conference-enabled X windows application is depicted in FIG. 7. In step 710, the conference enabler overrides a conferenced client that is in the process of displaying a pull-down menu. Specifically, in step 712, the conference enabler attempts to position the pull-down menu on behalf of the client in the location that is most appropriate for each participant. To do this, the conference enabler first, in step 714, correctly identifies a pull-down menu window from the X11 protocol stream, and second, in step 716, the conference enabler identifies the correct window related to the desired pull-down menu. Next, in step 718, the conference enabler then must know the location of this relative window as it appears on each of the displays in the conference.

The conference enabler, in step 720, maintains a list of all top-level windows created by a conferenced client (see FIG. 5) this includes pop-ups, pull-down menus, client frame windows, etc. Each entry in the list has associated with it a set of window attributes for each participant. The conference enabler, in step 722, tracks the location, size, parent-child relationship, and map state for each window in the list and it does this independently for each participant. In order to keep the information in the list current and consistent with participating X servers, the conferencing enabler, in step 724, asks to receive certain events that reveal window configuration information from each participating X server even if the conferenced client has not. Otherwise, the conferencing enabler risks not being informed of true window sizes and locations and then would not be able to guarantee accurate placement of pull-down menus of all participants.

Figure 8:
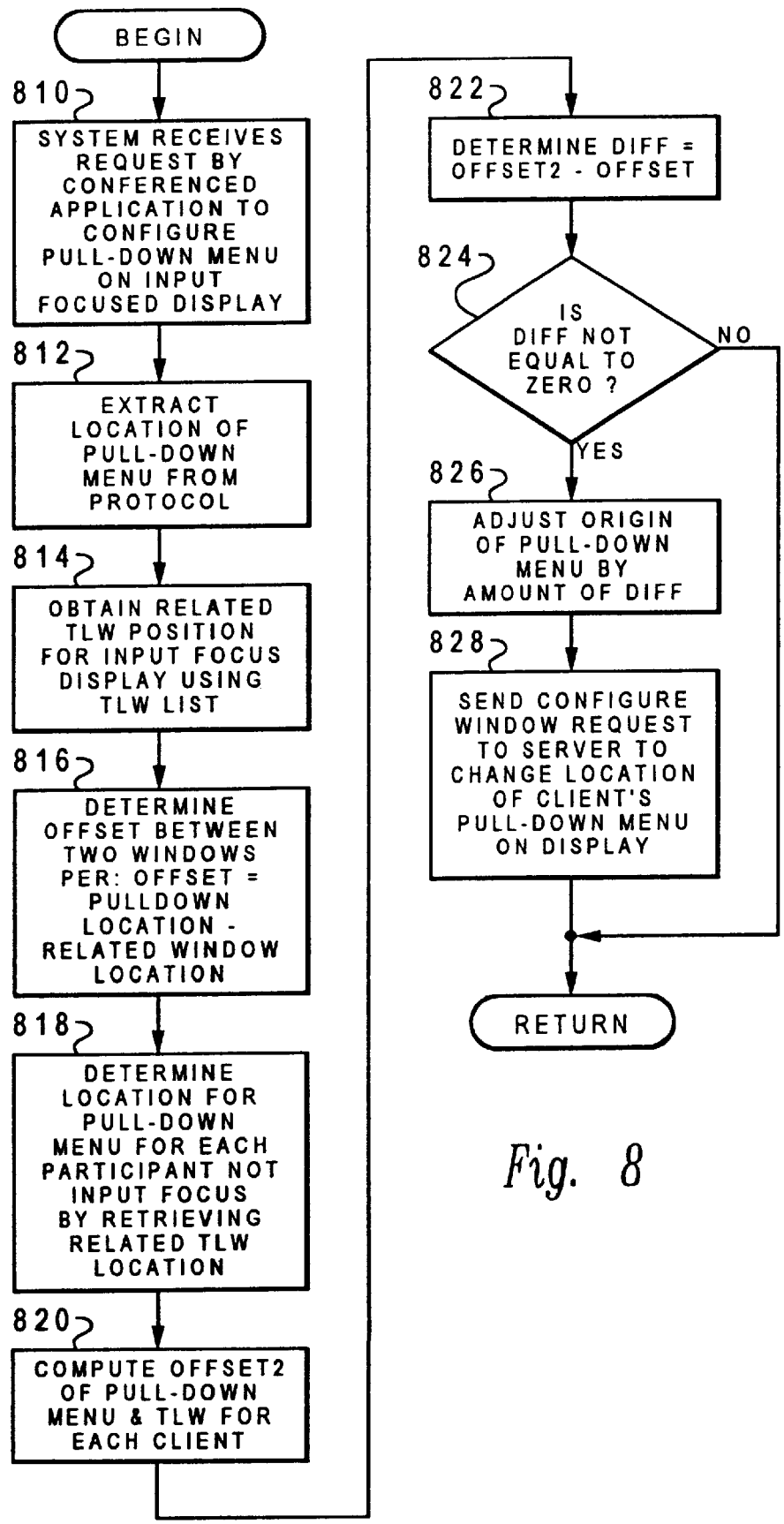

The conference enabler then, in step 726, exposed window configuration-specific information to the conference-enabled application from the input focus. That is, replies and events containing such information, typically from a Configure Notify event, are forwarded to the application only from the input focus X server. Thus, the application then, in step 728, attempts to position pull-down menus relative to the location of its windows as they exist on the input focus display. If the conferencing enabler did nothing else, placement of pull-down windows would be correct for the input focus, but would not likely be correct for the remaining participants. Accordingly, in step 730, the conferencing enabler then must override the pull-down menu location as specified by the application and translate that location to a new location that makes sense for non-input focus participants. The method is outlines in the flowchart in FIG. 8.

To begin, in step 810, the system receives a request by the conferenced application to configure the pull-down menu on the input focused display, which is unchanged. Next, in step 812, the system extracts the location of the pull-down menu from the protocol stream. In step 814, the system obtains "related" top-level window position (absolute focus window) for input focus display using the Top-Level Window List. In step 816, the system then computes the offset between the two windows according to the following formula: Offset=pulldown location−related window location. This step is performed using two-dimensional vector arithmetic. Afterwards, in step 818, the system determines the location for the pull-down menu for each participant who is not the input focus by first retrieving the "related" top-level window location. Then, in step 820, the conference enabler computes the offset, Offset2, of the origin of the pull-down menu for each client and its related Top-Level Window for that client. Next, in step 822, the enabler then calculates the difference Diff as being equal to Offset2—the first Offset or by the equation Diff=Offset2−Offset. Then, in step 824, the system determines if the difference, or Diff, is not Zero. If not, the system, is step 826, adjusts the origin of the pull-down menu by the amount Diff. Otherwise, the realignment is not necessary. Then, the system, in step 828, sends a Configure Window request to the client's server to change the actual location of the client's pull-down menu on the display.

While the invention has been particularly shown and described with reference to a preferred embodiment, it will be understood by those skilled in the art that various changes in form and detail may be made therein without departing from the spirit and scope of the invention.

What is claimed is:

1. In a conferencing network system having a conference enabler for distributing an application to a plurality of servers, each server having its own display, a method performed by said enabler for managing top-level windows controlled by said conference enabler amongst said plurality of servers, said method comprising the steps of:

identifying a top-level window in a window request coming from said conferenced application by identifying whether a window in said request has a root window as a parent;

maintaining a list of top-level windows for each of said servers at said conference enabler;

entering a window ID associated with said top-level window of said window request into said list of top-level windows;

providing a slot, associated with said top-level window of said window request, within said top-level window list for storing the window configuration of said top-level window of said window request as configured by a window manager at each said servers.

2. The method according to claim 1 further comprising the steps of:

monitoring communication between said conferencing application and said plurality of servers for requests to update the state of said top-level window;

monitoring events between said conferencing application and said plurality of serves to identify any changes in a window's configuration;

updating said top-level window list with said state or said changes of window configuration.

3. The method according to claim 2 further comprising the steps of:

requesting event information on behalf of said conferencing application;

updating said top-level window list with information obtained by said step of monitoring.

4. The method according to claim 3 wherein said step of requesting event information is performed by said enabler without the knowledge of said conferencing application.

5. In a conferencing network system having a conference enabler for distributing an application to a plurality of servers, each server having its own display, a system in said conference enabler for managing top-level windows controlled by said conference enabler amongst said plurality of servers, said system comprising:

means for a identifying top-level window in a window request coming from said conferenced application by identifying whether a top-level window in said request has a root window as a parent;

means for entering a window ID associated with said top-level window of said window request into a list of top-level windows maintained at said conference enabler;

means for providing a slot, associated with said top-level window of said window request, within said top-level window list for storing the window configuration of said top-level window of said window request as configured by a window manager at each of said servers.

6. The system according to claim 5 further comprising:

means for monitoring communication between said conferencing application and said plurality of servers for requests to update the state of said top-level window;

means for monitoring events between said conferencing application and said plurality of servers to identify any changes in a window's configuration;

means for updating said top-level window list with said state or said changes of window configuration.

7. The system according to claim 6 further comprising:

means for requesting event information on behalf of said conferencing application;

means for updating said top-level window list with information obtained by said means for monitoring.

8. The system according to claim 7 wherein said means for requesting event information is performed by said conferencing enabler without the knowledge of said conferencing application.

* * * * *